US010543795B2

(12) United States Patent
DeKeuster

(10) Patent No.: US 10,543,795 B2
(45) Date of Patent: Jan. 28, 2020

(54) BATTERY MODULE CONNECTOR BARREL

(71) Applicant: CPS Technology Holdings LLC, New York, NY (US)

(72) Inventor: Richard M. DeKeuster, Glendale, WI (US)

(73) Assignee: CPS Technology Holdings LLC, New York, NY (US)

( * ) Notice: Subject to any disclaimer, the term of this patent is extended or adjusted under 35 U.S.C. 154(b) by 369 days.

(21) Appl. No.: 15/256,258

(22) Filed: Sep. 2, 2016

(65) Prior Publication Data

US 2018/0065573 A1 Mar. 8, 2018

(51) Int. Cl.
*H01M 10/0525* (2010.01)
*H01M 2/06* (2006.01)
(Continued)

(52) U.S. Cl.
CPC ........... *B60R 16/0215* (2013.01); *H01M 2/06* (2013.01); *H01M 2/1083* (2013.01);
(Continued)

(58) Field of Classification Search
CPC ........... B60R 16/0215; H01M 2/1083; H01M 10/0525; H01M 2/24; H01M 2/06;
(Continued)

(56) References Cited

U.S. PATENT DOCUMENTS 4,207,390 A * 6/1980 Oehrlein ............... H01M 2/305
29/623.2
D256,356 S 8/1980 Lazerson
(Continued)

FOREIGN PATENT DOCUMENTS

EP 0921607 6/1999
EP 2355209 10/2011
(Continued)

OTHER PUBLICATIONS

PCT/US2017/042920 International Search Report and Written Opinion dated Nov. 7, 2017.

*Primary Examiner* — Muhammad S Siddiquee
(74) *Attorney, Agent, or Firm* — Boardman & Clark LLP

(57) ABSTRACT

A battery module includes a housing having a wall. The wall includes an opening extending from an inner surface of the wall facing an interior of the housing to an outer surface of the wall opposite to the inner surface. The battery module also includes a connector barrel having a first open end, a second open end, and a body portion extending between the first and second open ends. The body portion is positioned within the opening of the wall, the first open end is positioned within the interior of the housing, and the second open end is positioned external to the housing. A ridge on the body portion is disposed proximate to the outer surface of the wall, and a first circumferential bump on the body portion is disposed proximate to the inner surface of the wall. The battery module also includes a securement component disposed within a space defined by the first circumferential bump of the connector barrel. The wall is sandwiched between the ridge of the connector barrel and the securement component.

23 Claims, 6 Drawing Sheets

(51) Int. Cl.
  *H01M 2/24* (2006.01)
  *B60R 16/02* (2006.01)
  *H01M 2/10* (2006.01)
  *H01R 13/73* (2006.01)
  *H01M 2/20* (2006.01)
  *H01M 2/30* (2006.01)

(52) U.S. Cl.
  CPC ............ *H01M 2/206* (2013.01); *H01M 2/24* (2013.01); *H01M 2/305* (2013.01); *H01M 10/0525* (2013.01); *H01R 13/73* (2013.01); *H01M 2220/20* (2013.01); *Y02E 60/122* (2013.01); *Y02T 10/7011* (2013.01)

(58) Field of Classification Search
  CPC .. H01M 2/305; H01M 2/206; H01M 2220/20; H01R 13/73
  See application file for complete search history.

(56) References Cited

U.S. PATENT DOCUMENTS

| | | | |
|---|---|---|---|
| D319,813 S | 9/1991 | Kozono | |
| 5,127,848 A | 7/1992 | Taguchi | |
| D335,647 S | 5/1993 | Hood | |
| 5,378,552 A | 1/1995 | Dixon, Jr. | |
| 5,681,178 A | 10/1997 | Kunkle | |
| D389,457 S | 1/1998 | Beranek | |
| 6,312,277 B1 | 11/2001 | Holub | |
| 6,372,377 B1 | 4/2002 | Ovshinsky et al. | |
| D475,014 S | 5/2003 | Kano | |
| D588,990 S | 3/2009 | Kok | |
| D589,444 S | 3/2009 | Kok | |
| 7,722,372 B2 | 5/2010 | Matsumoto et al. | |
| 7,879,485 B2 | 2/2011 | Yoon et al. | |
| 7,892,011 B2 | 2/2011 | Beer | |
| 8,038,450 B2 | 10/2011 | Nakagawa | |
| 8,147,280 B2 | 4/2012 | Fernandez et al. | |
| 8,221,165 B2 | 7/2012 | DeWitte | |
| 8,237,400 B2 | 8/2012 | Gamboa et al. | |
| 8,328,581 B2 | 12/2012 | DeChazal | |
| D675,568 S | 2/2013 | Drew | |
| D678,203 S | 3/2013 | Corona | |
| 8,679,666 B1 | 3/2014 | Tsukamoto et al. | |
| 8,808,031 B2 | 8/2014 | Zhao | |
| 9,150,107 B2 | 10/2015 | Ferrel | |
| 9,321,340 B2 | 4/2016 | Maskew et al. | |
| D765,030 S * | 8/2016 | Tyler | D13/119 |
| 9,413,040 B2 | 8/2016 | Murakami et al. | |
| 2003/0024082 A1* | 2/2003 | Seymour | H01R 13/6335 24/546 |
| 2007/0087266 A1 | 4/2007 | Bourke et al. | |
| 2011/0167607 A1* | 7/2011 | Vidrine | B25B 27/0028 29/428 |
| 2014/0327444 A1 | 11/2014 | Rollan et al. | |
| 2014/0374994 A1* | 12/2014 | Monteil | F16L 17/035 277/314 |
| 2015/0069829 A1 | 3/2015 | Dulle et al. | |
| 2015/0147911 A1* | 5/2015 | Logan, Jr. | H01R 12/91 439/577 |
| 2015/0243946 A1 | 8/2015 | Ahn | |
| 2016/0043448 A1 | 2/2016 | Fritz | |
| 2016/0107530 A1 | 4/2016 | Roberts et al. | |
| 2016/0133908 A1 | 5/2016 | Zhao | |
| 2016/0197320 A1 | 7/2016 | Mack et al. | |
| 2016/0226112 A1* | 8/2016 | Maskew | B60K 6/28 |
| 2016/0301111 A1 | 10/2016 | Tyler et al. | |

FOREIGN PATENT DOCUMENTS

| | | |
|---|---|---|
| EP | 2894695 | 7/2015 |
| WO | 98/31059 | 7/1998 |
| WO | 2013/188680 | 12/2013 |
| WO | 2016/112008 A1 | 7/2016 |
| WO | 2016112008 | 7/2016 |
| WO | 2016/167866 A1 | 10/2016 |

* cited by examiner

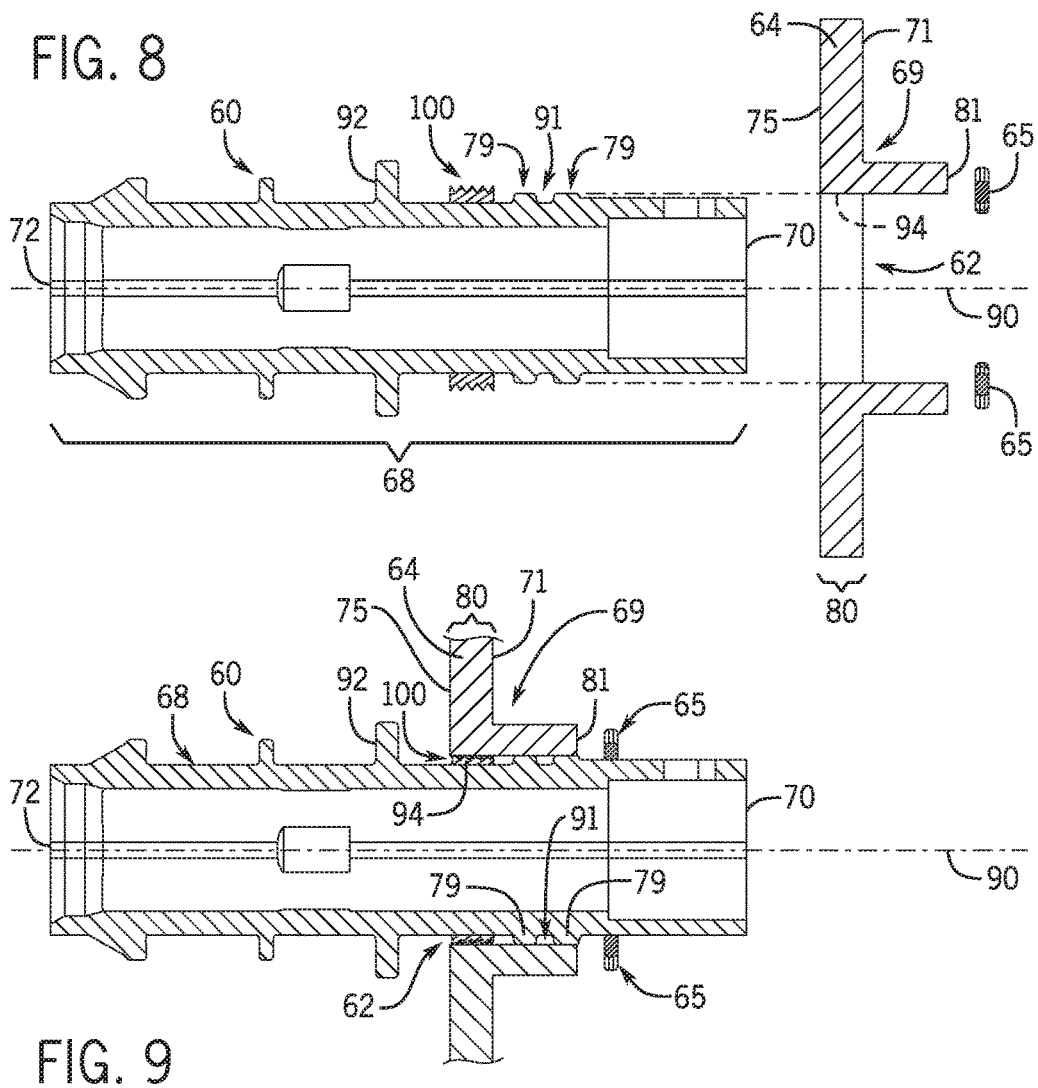
FIG. 8
FIG. 9
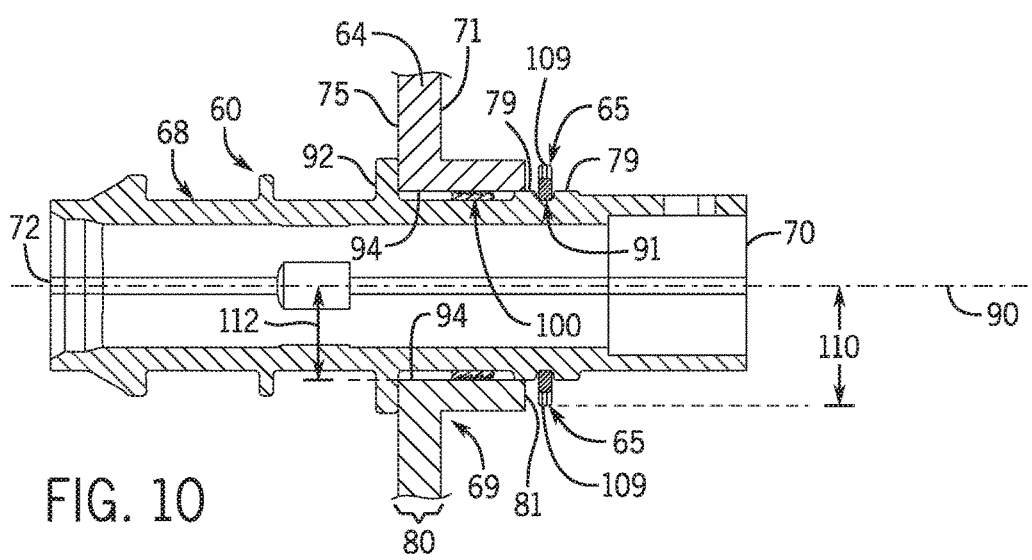
FIG. 10

BATTERY MODULE CONNECTOR BARREL

BACKGROUND

The present disclosure relates generally to the field of batteries and battery modules. More specifically, the present disclosure relates to a connector barrel disposed within a housing of a battery module that supports and guides electrical circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include electrical circuitry that is disposed within a housing of the battery module. It may be beneficial to provide components that support and guide the electrical circuitry within the housing. It is now recognized that techniques for manufacture these components and integration of these components within the housing of the battery module are desired. Furthermore, it is now recognized that defining the geometry of these components such that they provide a desired amount of support within the limited space available within a battery module is desired. Accordingly, it is now recognized that it may be desirable to provide components that guide various electrical circuitry of the battery module while providing the desired amount of support and protection within the housing. Further, it may be desirable to integrate these components with the housing of the battery module.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to a battery system having a battery module. The battery module includes a housing having a wall at least partially defining an interior of the housing, where the wall includes an opening extending from an inner surface of the wall facing the interior of the housing to an outer surface of the wall opposite to the inner surface. The battery module also includes a connector barrel having a first open end, a second open end, and a body portion extending between the first and second open ends. The body portion is positioned within the opening of the wall. Further, the first open end is positioned within the interior of the housing. Further still, the second open end is positioned external to the housing. A ridge on the body portion of the connector barrel is disposed proximate to the outer surface of the wall, and a first circumferential bump on the body portion of the connector barrel is disposed proximate to the inner surface of the wall. The battery module also includes a securement component disposed within a space at least partially defined by the first circumferential bump of the connector barrel such that the securement component is positioned proximate to the inner surface of the wall, and such that the wall is sandwiched between the ridge of the connector barrel and the securement component.

The present disclosure also relates to a battery system having a connector barrel configured to receive a first signal connector and a second signal connector. The connector barrel includes a first open end, a second open end, and a body portion having a hollow conduit extending between the first open end and the second open end. The first open end is configured to receive the first signal connector, the second open end is configured to receive the second signal connector, and the hollow conduit is configured to enable mating of the first and second signal connectors within the hollow conduit. A ridge of the connector barrel extends radially outward from the hollow conduit of the body portion with respect to a longitudinal axis of the connector barrel. Further, a first circumferential bump of the connector barrel extends radially outward from the hollow conduit of the body portion with respect to the longitudinal axis. The first circumferential bump at least partially defines a groove. Further, the connector barrel includes a clip configured to be disposed in the groove. The ridge and the clip are configured to define a space in which a wall of a battery module of the battery system is positioned such that the wall is sandwiched between the clip and the ridge, such that the body portion of the connector barrel is disposed in an opening of the wall, such that the first open end of the connector barrel is disposed in an interior of the battery module, and such that the second open end of the connector barrel is disposed external to the battery module.

The present disclosure also relates to a battery system having a battery module, where the battery module includes a housing having a wall with an opening extending through the wall, a connector barrel having a body portion positioned within the opening, a first open end proximate to a first surface of the wall, and a second open end proximate to a second surface of the wall opposite to the first surface of the wall, and a ridge of the connector barrel. The ridge extends radially outward from a longitudinal axis of the connector barrel. The ridge is disposed between the second surface of the wall and the second open end of the connector barrel. The ridge is configured to block movement of the connector barrel in a first direction along the longitudinal axis within the opening. The battery module also includes a securement mechanism coupled with the body portion of the connector barrel between the first surface of the wall and the first open end of the connector barrel. The securement mechanism is configured to block movement of the connector barrel in a second direction along the longitudinal axis opposite to the first direction

DRAWINGS

These and other features, aspects, and advantages of the present disclosure will become better understood when the following detailed description is read with reference to the accompanying drawings in which like characters represent like parts throughout the drawings, wherein:

FIG. 8 is an exploded cross-sectional view of an embodiment of the connector barrel of FIG. 7, in accordance with an aspect of the present disclosure;

FIG. 9 is a cross-sectional view of an embodiment of the connector barrel of FIG. 7 during an intermediate stage of assembly, in accordance with an aspect of the present disclosure; and FIG. 10 is a cross-sectional view of an embodiment of the connector barrel of FIG. 7, in accordance with an aspect of the present disclosure.

DETAILED DESCRIPTION

Figure 1:
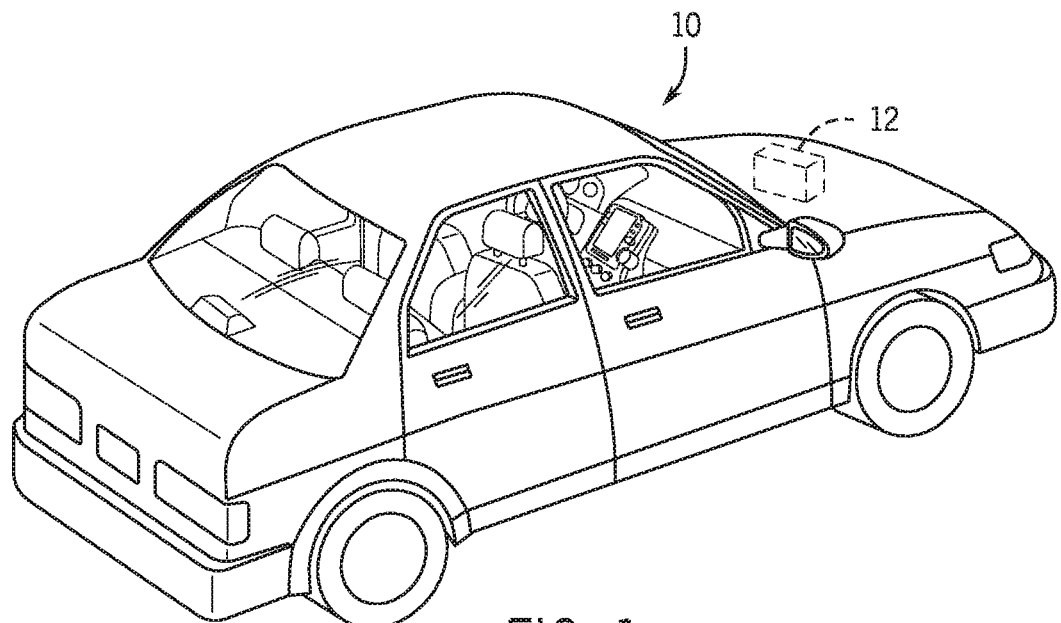
FIG. 1 is a perspective view of a vehicle having a battery system configured to provide power for various components of the vehicle, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing having a connector barrel disposed therein. The connector barrel is configured to enable passage of electrical circuitry therethrough, such that the connector barrel supports and guides the electrical circuitry. In certain embodiments, the connector barrel may guide and route one or more electrical signal connectors, such as a low voltage signal connector and a vehicle control module connector that connect the battery module to a vehicle control module. Specifically, the low voltage signal connector and the vehicle control module connector may be inserted through opposing ends of the connector barrel to mate within the connector barrel. The connectors may be utilized to connect the electronics and/or control circuits disposed within the housing of the battery module to a vehicle control module disposed external to the battery module. In certain embodiments, the connector barrel may guide and/or route other types of electrical circuitry, such a high voltage connector (which may be used to connect the power output of the battery module to the vehicle power system) or a grounding stud (which may serve as a connection point to connect the battery module to the ground). Indeed, while the connector barrel may be utilized to guide and route a variety of different types of electrical circuitry disposed within the housing, embodiments of the present disclosure will be discussed with respect to the low voltage signal connector and the vehicle control module connector.

In certain embodiments, the connector barrel may be a hollow conduit having a body portion and two open ends disposed on opposite ends of the body portion. In certain embodiments, the low voltage signal connector may mate with a complementary vehicle control module connector within the connector barrel. Specifically, the connector barrel may be configured to house both the low voltage signal connector and the vehicle control module connector within the hollow conduit. For example, the low voltage signal connector may pass through the first open end of the hollow conduit, and the voltage signal connector may pass through the second open end of the hollow conduit. The low voltage signal connector may then mate (e.g., connect) with the vehicle control module connector within the hollow conduit. In this manner, the connector barrel may be utilized to connect the electronics and/or control circuits disposed within the housing of the battery module to a vehicle control module outside the battery module.

In certain embodiments, the connector barrel may be disposed through an opening within a wall of the housing. The connector barrel may be configured such that the first open end of the connector barrel is disposed within the housing, the second open end of the connector barrel is disposed outside of the housing, and the body portion (e.g., conduit) of the connector barrel is positioned within the opening in the wall of the housing. Accordingly, the low voltage signal connector may be received in the first open end within the housing, and the vehicle control module connector may be received in the second open end outside of the housing.

In certain embodiments, the connector barrel may be fixed with respect to the wall of the housing (e.g., by a securement component, such as a ridge, a clip or pin, or a combination thereof). For example, the connector barrel may be inserted through the opening in the wall of the housing from an area external to the battery module. The connector barrel may have a ridge extending radially outward from a longitudinal axis extending through the body portion of the connector barrel. The ridge may include an outer diameter or distance (e.g., from the longitudinal axis) greater than an inner diameter of the opening in the wall of the housing. Accordingly, the ridge of the connector barrel may contact an outer surface of the wall of the housing after the connector barrel is pushed through the opening.

After inserting the connector barrel through the opening in the wall of the housing, one or more circumferential bumps proximate to the first end of the connector barrel may be positioned within the housing of the battery module. The one or more bumps of the connector barrel may extend radially outward from the body portion of the connector barrel, but may include an outer diameter smaller than an inner diameter of the opening through which the connector barrel is disposed. Accordingly, the connector barrel is able to pass through the opening without the bumps interfering. The bumps may also define a space or groove (e.g., between the bumps), where the groove is configured to receive a clip (e.g., a pin). The clip may include a thickness that extends above a height of the bumps when engaged with the connector barrel. Accordingly, while an outer diameter of each of the bumps may be less than an inner diameter of the opening in the wall of the housing (e.g., to enable the connector barrel to pass through the opening), the clip may include an outer diameter (e.g., measured from the longitudinal axis) greater than the inner diameter of the opening. The clip, then, may contact (or may be configured to contact) an inner surface of the wall opposite to the outer surface of the wall. In other words, the wall of the housing may be sandwiched between the clip (e.g., proximate to the inner surface) and the ridge (e.g., proximate to the outer surface) of the connector barrel described above, thereby fixing the connector barrel in place within the opening.

In some embodiments, the connector barrel may include flexible teeth disposed on the body portion of the connector barrel. For example, the flexible teeth may be rubber and may be disposed (e.g., via adhesive) on and about an area of the body portion that, when the connector barrel is fixed in place within the opening of the wall of the housing, is positioned within the opening of the wall. Further, the flexible teeth may extend to a diameter greater than the inner diameter of the opening. Accordingly, as the connector barrel is pushed through the opening of the wall, the flexible teeth may contact the inner diameter of the opening of the wall. The flexible teeth may bend, enabling the connector barrel to pass through the opening with the flexible teeth in contact with the inner diameter of the opening. Once the connector barrel is fixed in place (e.g., via the pin, as described above), the flexible teeth may continue to contact the inner surface of the opening of the wall (e.g., with the flexible teeth in a bent position). Accordingly, the flexible teeth may generate a gasket seal surface between the connector barrel and the wall. The gasket seal surface may block egress and ingress of liquids and/or gasses through the opening. In some embodiments, the flexible teeth may press through the opening and engage the wall to resist disengagement of the connector barrel from the wall in a manner similar to the pin.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
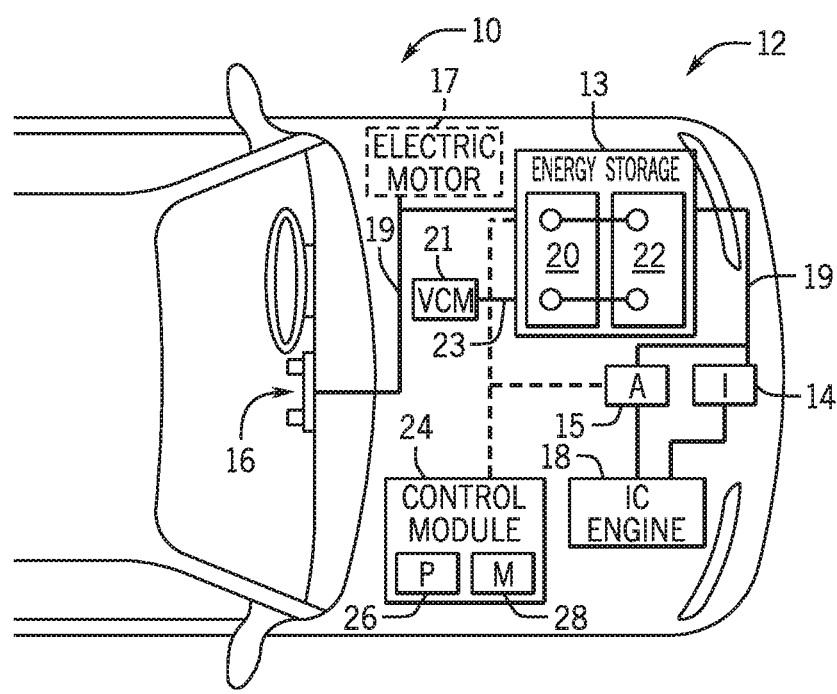
FIG. 2 is cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, a vehicle control module (VCM) 21, and optionally to an electric motor 17. Generally, the energy storage component 13 may capture/ store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like. While the control module 24 is illustrated external to the battery system 12, the control module 24 may be disposed within, for example, the lithium ion battery module 20.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Additionally, the vehicle 10 may include the VCM 21 that may control one or more operational parameters of the various components of the vehicle 10. In certain embodiments, the VCM 21 may include one or more processor 26 and one or more memory 28 programmed to perform such tasks. The battery modules 20, 22 may be coupled to the VCM 21 via one or more communication lines. For example, a vehicle control module line 23 may be utilized to couple the VCM 21 to the battery module 20, as further described in detail below. The VCM 21 may receive input from the battery modules 20, 22 (and more specifically, from the control module 24) regarding various parameters, such as a state of charge and temperature. The VCM 21 may be configured to utilize the received information to determine when to charge and/or discharge the battery module 20, when to discontinue charging the battery module 20, and so forth.

The illustrated battery module 20 (which is encompassed in the battery system 12 of FIG. 1) of FIG. 2 may include features configured to enable electrical communication between the control module 24 (e.g., of the battery module 20) and, for example, the vehicle control module 21 of the vehicle 10. In accordance with the present disclosure, the battery module 20 may include a connector barrel configured to support mating of a connector of the control module 24 of the battery module 20 and a connector of the vehicle control module 21 of the vehicle 10. These and other feature will be described in detail below with reference to later figures.

Figure 3:
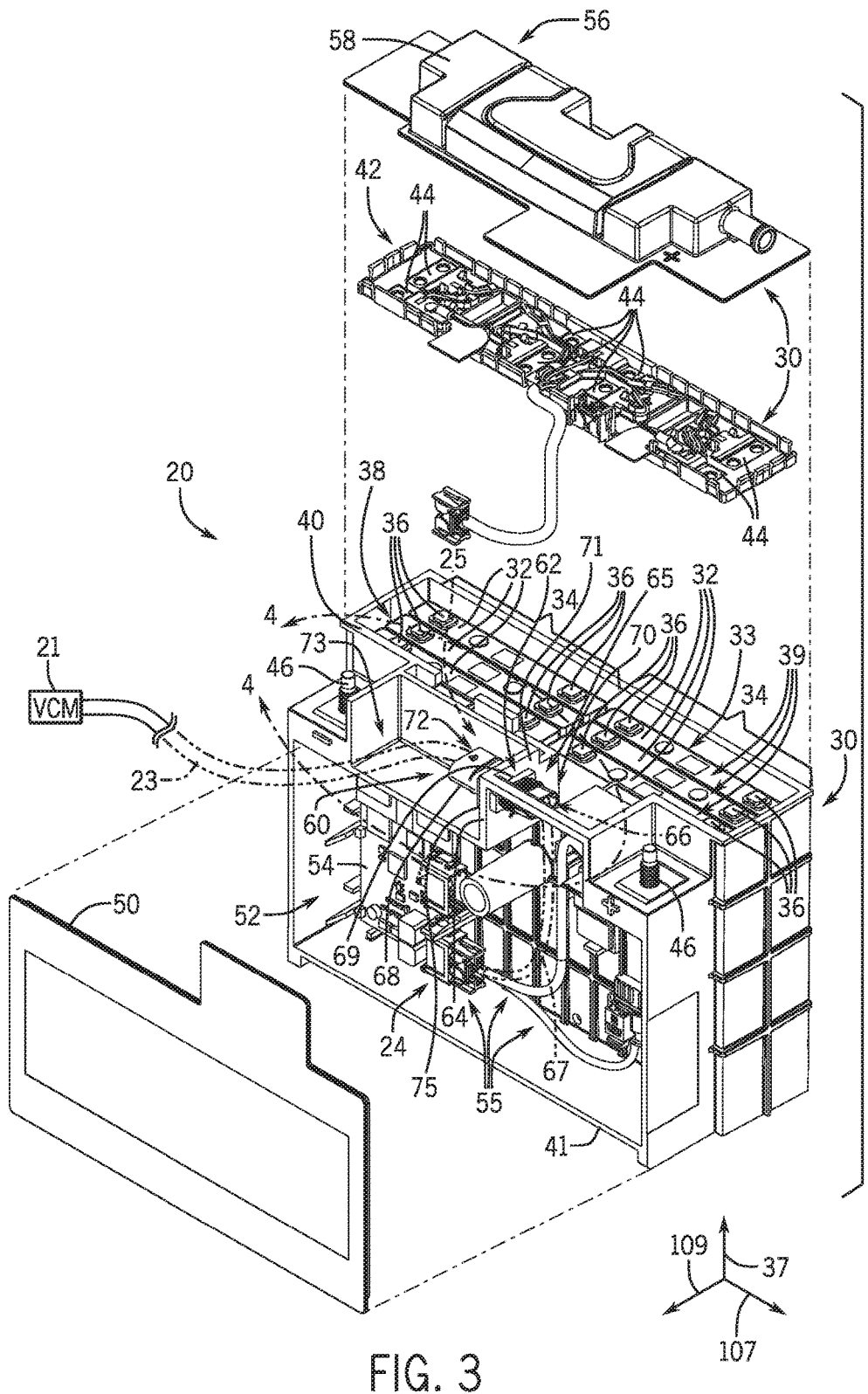
FIG. 3 is a perspective view of an embodiment of a battery module for use in the vehicle of FIG. 2, in accordance with an aspect of the present disclosure.

An overhead exploded perspective view of an embodiment of the battery module 20 for use in the vehicle 10 of FIG. 2 is shown in FIG. 3. In the illustrated embodiment, the battery module 20 (e.g., lithium ion [Li-ion] battery module) includes a housing 30 and electrochemical cells 32 disposed inside the housing 30. For example, the electrochemical cells 32 are received through a cell receptacle region 33 of the housing 30 and into the inside of the housing 30. In the illustrated embodiment, six prismatic lithium-ion (Li-ion) electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 extending upwardly (e.g., in direction 37) from terminal ends 39 of the electrochemical cells 32. Accordingly, the terminals 36 may extend outwardly from the cell receptacle region 33 toward an upper side 40 (e.g., upper end or face opposite a base 41) of the housing 30. For example, the electrochemical cells 32 may be inserted into the housing 30 through the cell receptacle region 33 in the upper side 40, and positioned within the housing 30 such that the terminals 36 of the electrochemical cells 32 are disposed in the cell receptacle region 33. A bus bar carrier 42 may be disposed into the cell receptacle region 33 and may retain bus bars 44 disposed thereon, where the bus bars 44 are configured to interface with the terminals 36 of the electrochemical cells 32. For example, the bus bars 44 may interface with the terminals 36 to electrically couple the electrochemical cells 32 together. Depending on the embodiment, the bus bars 44 may couple the electrochemical cells 32 in series, in parallel, or some of the electrochemical cells 32 in series and some of the electrochemical cells 32 in parallel. Further, certain of the bus bars 44 may be configured to electrically couple the electrically interconnected group of electrochemical cells 32 with major terminals 46 of the battery module 20, where the major terminals 46 are configured to be coupled to a load (e.g., component(s) of the vehicle 10) to power the load.

In the illustrated embodiment, the housing 30 of the battery module 20 includes one or more covers configured to seal the housing 30. For example, the cell receptacle region cover 56 may be disposed over the upper side 40 of the housing 30 (and over the bus bar carrier 42) to seal the upper side 40 of the housing 30. In certain embodiments, the bus bar carrier 42 may be coupled to the housing 30 to fix the bus bar carrier 42 within the cell receptacle region 33 and over the electrochemical cells 32. As a further example, the housing 30 may include an electronics compartment cover 50 that fits over an electronics compartment 52 of the housing 30, where the electronics compartment 52 of the housing 30 retains, for example, a printed circuit board (PCB) 54 and other electrical components 55 (e.g., a relay, communications lines, etc.) of the battery module 20. In certain embodiments, the electronics compartment cover 50 and/or the cell receptacle region cover 56 may be welded (e.g., laser welded) to the body of the housing 30.

In accordance with embodiments of the present disclosure, a connector barrel 60 (e.g., comprising electrically insulative material, such as nylon or plastic) may be disposed through an opening 62 within a wall 64 of the housing 30. The opening 62 may be a passageway between the interior of the housing 30 and the exterior of the housing 30. Specifically, the connector barrel 60 may be configured to receive a low voltage signal connector 66 from the control module 24 disposed within the interior of the electronics compartment 52 (e.g., within the housing 30). Likewise, the connector barrel 60 may be configured to receive a vehicle control module connector 25 (e.g., of the VCM 21). In certain embodiments, the low voltage signal connector 66 may be communicatively coupled to a low voltage signal line 67 (e.g., spanning between the low voltage signal connector 66 and the control module 24 of the battery 20), and the vehicle control module connector 25 may be communicatively coupled to the vehicle control module line 23 (e.g., spanning between the vehicle control module connector 25 and the VCM 21). In this manner, the low voltage signal line 67 and the vehicle control module line 23 may be communication lines that are configured to communicatively couple the control module 24 with the VCM 21, as described in detail below.

The low voltage signal connector 66 and the vehicle control module connector 25 may be configured to mate within the connector barrel 60. In such embodiments, the connectors 66, 25 may work with the low voltage signal line 67 and the vehicle control module line 23, respectively, to connect the control module 24 to the VCM 21. Specifically, the low voltage signal connector 66 and the vehicle control module connector 25 (working with the low voltage signal line 67 and the vehicle control module line 23) may be configured to provide information, related to conditions of the battery module 20, to the vehicle control module 21. For example, in certain embodiments, information related to state of the charge of the battery module 20, the temperature of the battery module 20, one or more warnings related to the battery module 20, a status change of the battery module 20, or any other information related to the overall condition of the battery module 20 may be transmitted to the VCM 21.

In certain embodiments, the connector barrel 60 may be a hollow conduit having a body portion 68, a first open end 70, and a second open end 72 opposite the first open end 70. In particular, the first open end 70 may be disposed inside the housing 30, and may be configured to receive the low voltage signal connector 66 within the housing 30. Further, the second open end 72 may be disposed outside the housing 30, and may be configured to receive the vehicle control module connector 25 outside the housing 30. Specifically, the second open end 72 may be disposed within a recess 73 of housing 30, such that the connector barrel 60 may be inserted at the recess 73 into the opening 62. As noted above, the low voltage signal connector 66 and the vehicle control module connector 25 may mate within the hollow conduit (e.g., body portion 68) of the connector barrel 60. In this manner, the connector barrel 60 may house the low voltage signal connector 66 from inside the housing 30 of the battery module 20 and the vehicle control module connector 25 from outside of the battery module 20. Accordingly, the opening 62 disposed within the wall 64 of the housing 30 may be configured to secure the connector barrel 60, and to allow the passage of the low voltage signal connector 66 and the vehicle control module connector 25 through the connector barrel 60, as described in further detail below.

As previously described, the first open end 70 of the connector barrel 60 may be inserted through the opening 62 of the housing 20 (e.g., from outside of the housing 20). The connector barrel 60 may include a ridge that contacts an outer surface 75 of the wall 64 after the connector barrel 60 is inserted into the opening 64, where the ridge blocks the connector barrel 60 from falling entirely into the interior of the housing 30. The ridge, blocked from view by the wall 64 in the illustrated embodiment, may interfere with (e.g., contact) the second surface 75 (e.g., outer surface) of the wall 64. Further, after the connector barrel 60 has been inserted through the opening 62, a securement component (e.g., such as a clip 65 or pin, as shown) may be disposed in grooves of the connector barrel 60 (e.g., proximate to the first open end 70), where the securement component (e.g., the clip 65) interferes with (e.g., contacts) a collar 69 disposed on a first surface 71 (e.g., inner surface) of the wall 64. For example, the clip 65 may apply a spring force against the body portion 68 of the connector barrel 60 to maintain a position of the clip 65 on the body portion 68. Accordingly, the clip 65 (e.g., contacting the inner surface 71 of the wall 64) and the ridge (e.g., contacting the outer surface 75 of the wall 64) may together sandwich the wall 64 therebetween, fixing the connector barrel 60 in place with respect to the wall. These and other features will be described in detail below with reference to later figures.

Figure 4:
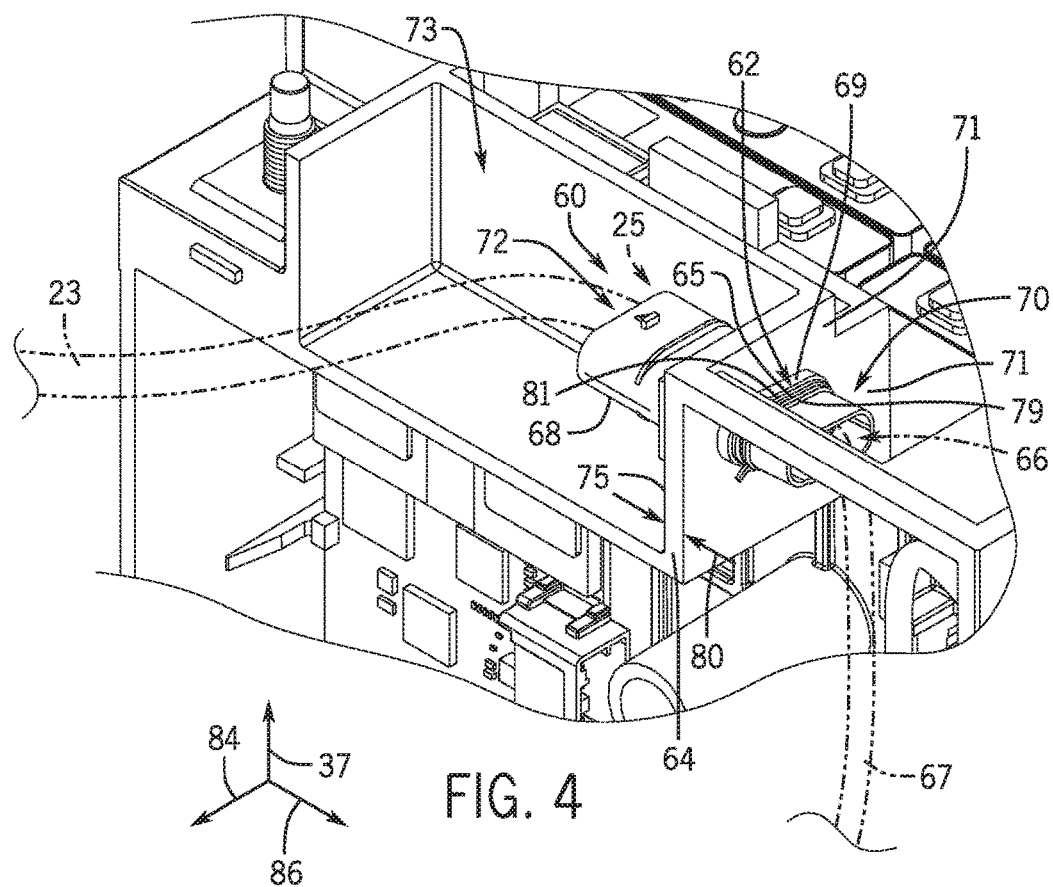
FIG. 4 is a detailed view of the battery module of FIG. 3 taken along lines 4-4 of FIG. 3, illustrating a connector barrel for use in the battery module of FIG. 3, in accordance with an aspect of the present disclosure.

FIG. 4 is a detailed view of the battery module 20 of FIG. 3 taken along lines 4-4, illustrating the connector barrel 60 in accordance with an aspect of the present disclosure. As shown, the first open end 70 may be disposed inside the housing 30 and may be configured to receive the low voltage signal connector 66 within the housing 30. Further, the second open end 72 may be disposed within the recess 73 of housing 30, and may be configured to receive the vehicle control module connector 25. The wall 64 may include the collar 69 extending from the first surface 71 of the wall 64 into the inside of the housing 30. The connector barrel 60 may include one or more circumferential bumps 79 proximate to the first open end 70 of the connector barrel 60 and extending circumferentially around the body portion 68 of the connector barrel 60. The circumferential bumps 79 may define a space or groove therebetween; alternatively, a single circumferential bump 79 may define a space or groove between the bump 79 and the collar 69 of the wall 64. The groove is configured to receive the illustrated clip 65, which contacts (or is capable of contacting) a radial surface 81 of the collar 69. Thus, if the connector barrel 60 is pushed or pulled toward the recess 73 (e.g., away from the inside of the housing 30), the clip 65, when engaged with the connector barrel 60 at the groove, contacts the radial surface 81 of the collar 69 and blocks movement of the connector barrel 60.

Additionally, a ridge of the connector barrel 60 is disposed proximate to the second open end 72 of the connector barrel 60 and is configured to block the connector barrel 60 from falling into the inside of the housing 30. For example, the ridge, which is blocked from view in the illustrated embodiment by the wall 64, is configured to contact the outer surface 75 of the wall 64 opposite to the inner surface 71 of the wall 64, where the outer surface 75 and the inner surface 71 are separated from one another by a thickness 80 of the wall 64. If the connector barrel 60 is pushed or pulled toward the inside of the housing 30, the ridge blocks movement of the connector barrel 60. These and other features will be described in detail below with reference to FIGS. 5-10.

Figure 5:
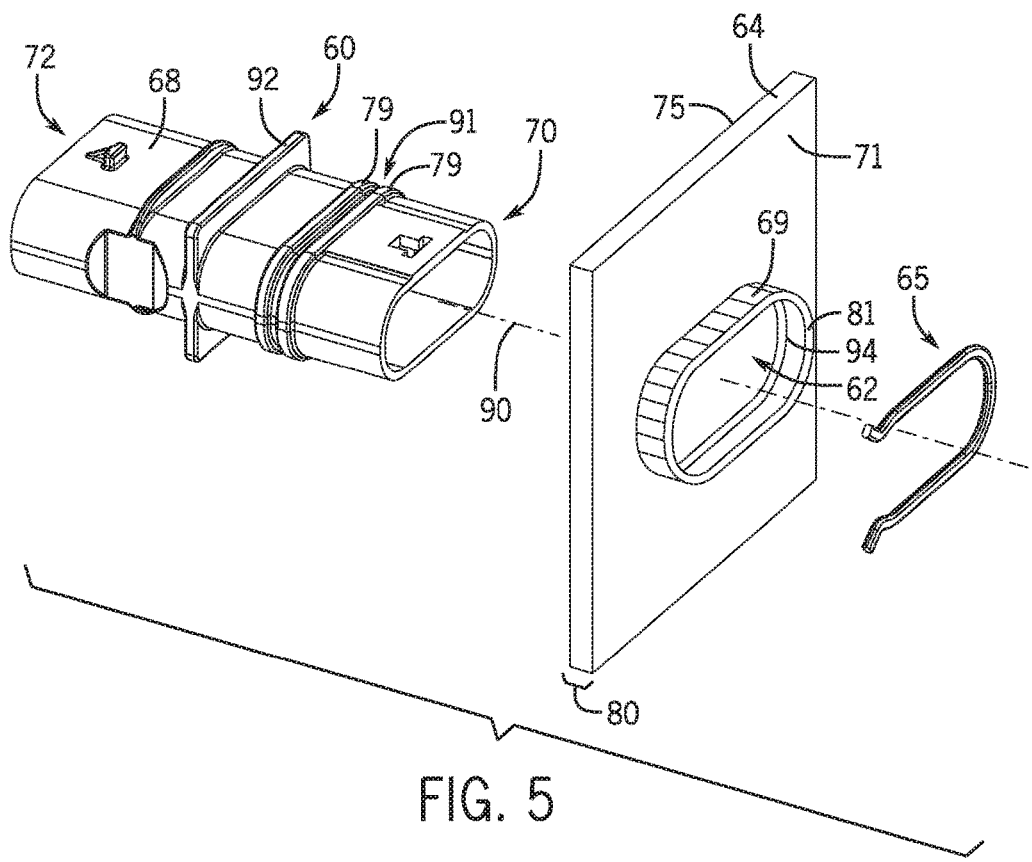
FIG. 5 is an exploded perspective view of an embodiment of the connector barrel for use in the battery module of FIG. 3, in accordance with an aspect of the present disclosure.
Figure 6:
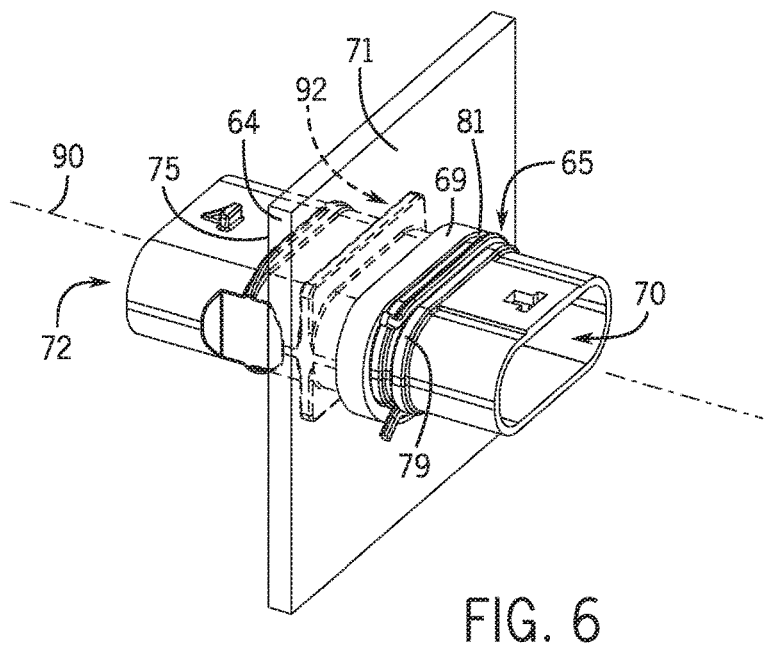
FIG. 6 is a perspective view of an embodiment of the connector barrel of FIG. 5, in accordance with an aspect of the present disclosure.

FIG. 5 is an exploded perspective view of an embodiment of the connector barrel 60 for use in the battery module 20 of FIG. 3. In the illustrated embodiment, the connector barrel 60 includes, as previously described, the first open end 70, the second open end 72, and the body portion 68 extending between the first and second open ends 70, 72. The connector barrel 60 also includes two circumferential bumps 79 extending radially outward from a longitudinal axis 90 of the connector barrel 60 (e.g., where the two circumferential bumps 79 are disposed proximate to the first end 70 of the connector barrel 60). The two circumferential bumps 79 define a space or groove 91 disposed therebetween. The connector barrel 60 also includes a ridge 92, as previously described, disposed closer than the bumps 79 to the second open end 72 of the connector barrel 60. After inserting the connector barrel 60 through the opening 62 in the wall 64, the ridge 92 may contact the outer surface 75 of the wall 64. Thus, the ridge 92 contacting the outer surface 75 of the wall 64 blocks the connector barrel 60 from falling through the opening 62. In other words, the ridge 92 contacting the outer surface 75 blocks the second end 72 of the connector barrel 60 from extending through the opening 62. It should be noted, as shown in the illustrated embodiment, that the opening 62 in the wall 64 may extend through the thickness 80 of the wall 64, and through the collar 69 extending from the inner surface 71 of the wall 64. The collar 69 may be integrally formed with the wall 64, or may be otherwise coupled to the wall 64 (e.g., via welding, adhesive, etc.).

After the ridge 92 contacts (or comes in close proximity to) the outer surface 75 of the wall 64, the clip 65 is disposed within the groove 91 between the two circumferential bumps 79 of the connector barrel 60. While an inner diameter 94 of the opening 62 in the wall 64 (and the collar 69) is sized to accommodate passage of the bumps 79 therethrough, the clip 65 may include an outer diameter or thickness greater than the inner diameter 94 of the opening 62. Accordingly, after disposing the clip 65 into the groove 91, the clip 65 may contact the radial surface 81 of the collar 69 of the wall 64, thereby blocking movement of the connector barrel 60 if the connector barrel 60 is pushed or pulled out of the opening 62 and toward the recess 73 illustrated in FIGS. 3 and 4. Indeed, the clip 65 and the ridge 92 sandwich the wall 64 (including the collar 69) therebetween, fixing the connector barrel 60 in place with respect to the wall 64. Thus, the ridge 92 blocks motion of the connector barrel 60 in a first direction along the longitudinal axis 90, and the clip 65 blocks motion of the connector barrel 60 in a second direction along the longitudinal axis 90 opposite to the first direction. An embodiment of the connector barrel 60 of FIG. 5, showing the wall 64 (including the collar 69 thereof) sandwiched between the clip 65 and the ridge 92 of the connector barrel 60, is shown in a perspective view in FIG. 6.

Figure 7:
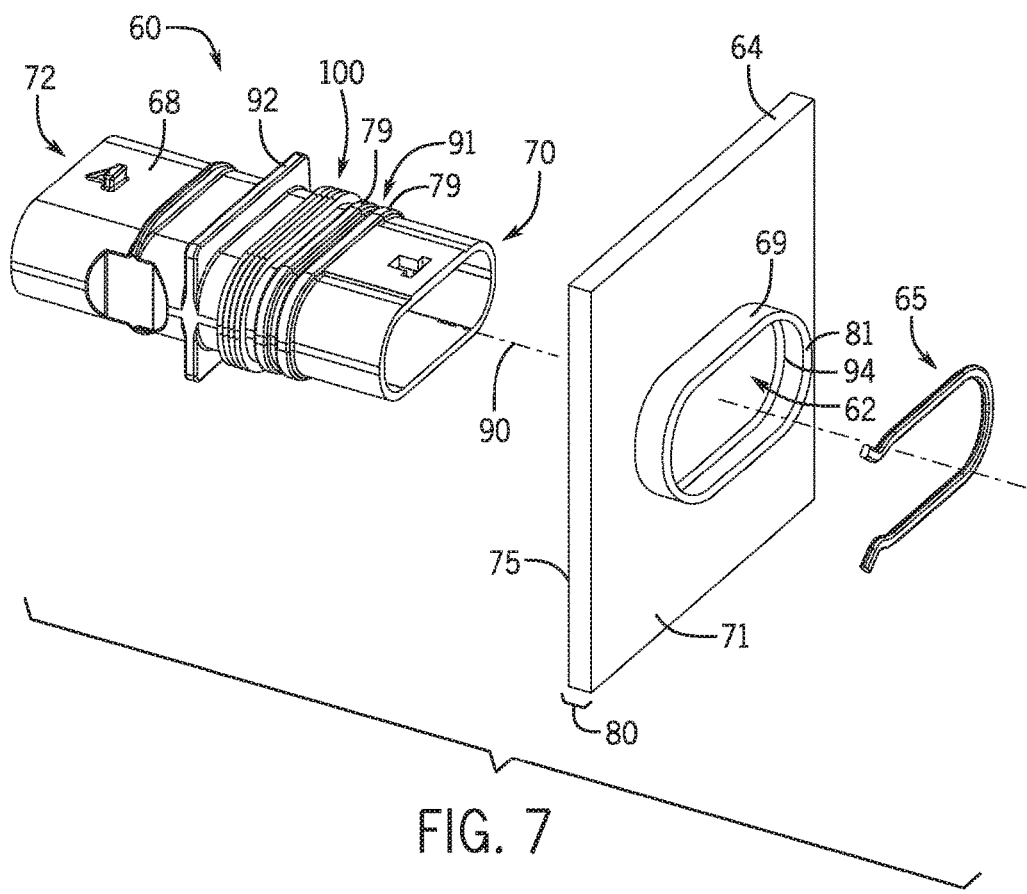
FIG. 7 is an exploded perspective view of an embodiment of the connector barrel for use in the battery module of FIG. 3, in accordance with an aspect of the present disclosure.

FIG. 7 is an exploded perspective view of an embodiment of the connector barrel 60 for use in the battery module 30 of FIG. 3. The illustrated connector barrel 60 includes the previously described circumferential bumps 79 defining the groove 91 in which the clip 65 is disposed (e.g., after inserting the connector barrel 60 through the opening 62 such that the ridge 92 of the connector barrel 60 contacts the outer surface 75 of the wall 64). However, the connector barrel 60 also includes one or more flexible teeth 100 (e.g., made of rubber) disposed between the circumferential bump (s) 79 and the ridge 92. The flexible teeth 100 may be configured to contact the inner diameter 94 of the opening 62 of the wall 64. For example, the flexible teeth 100 may bend as the connector barrel 60 is pushed through the opening 62. Further, the flexible teeth 100 remain positioned (e.g., in a bent position) within the opening 62 of the wall 64 once the ridge 92 contacts the outer surface 75 of the wall 60, and after the clip 65 is positioned within the groove 91 between the bumps 79. In other words, the flexible teeth 100 remain bent and in contact with the inner diameter 94 of the opening 62 of the wall 64 once the connector barrel 60 is fixed with respect to the wall 64. The flexible teeth 100 form a gasket seal surface against the inner diameter 94 of the opening 62 in the wall 64, thereby sealing the opening 62 and blocking ingress/egress of liquids and/or gas through the opening 62. It should be noted that the flexible teeth 100 may be coupled with the body portion 68 of the connector barrel 60 several different ways. For example, the flexible teeth may be adhesively coupled with the body portion 68 of the connector barrel 60. Additionally or alternatively, the flexible teeth 100 may be integral with a flexible ring that fits around the body portion 68 of the connector barrel 60, where the flexible ring is stretch fit on the body portion 68.

To help illustrate the flexible teeth 100 and corresponding features described above, FIG. 8 is an exploded cross-sectional view of an embodiment of the connector barrel of FIG. 7, FIG. 9 is a cross-sectional view of an embodiment of the connector barrel of FIG. 7 during an intermediate stage of assembly, and FIG. 10 is a cross-sectional view of an assembled embodiment of the connector barrel of FIG. 7. In other words, FIG. 8 shows the connector barrel 60 and the wall 64 prior to fixing the connector barrel 60 within the opening 62 of the wall 64, FIG. 9 shows the connector barrel 60 being inserted into the opening 62, and FIG. 10 shows the connector barrel 60 fixed within the opening 62. As shown, and as previously described, the first open end 70 of the connector barrel 60 is inserted through the opening 62 in the wall 64, until the ridge 92 contacts the outer surface 75 of the wall 64. Once the ridge 92 contacts the outer surface 75 of the wall 64, the flexible teeth 100 are positioned (e.g., in a bent position) within the opening 62 in the wall 64. Accordingly, the flexible teeth 100 form a gasket seal surface at the inner diameter 94 of the opening 62 in the wall 64.

Additionally, once the ridge 92 contacts (or comes in close proximity to) the outer surface 75 of the wall 64, the clip 65 is disposed into the groove 91 between the two circumferential bumps 79 on the body portion 68 of the connector barrel 60. As shown in FIG. 10, an outer surface of the clip 65 is positioned a first distance 110 (e.g., radial distance) from the longitudinal axis 90, where the first distance 110 is greater than a second distance 112 of the inner diameter 94 of the opening 62 from the longitudinal axis 90 of the connector barrel 60. Accordingly, the clip 65 may not pass through the opening 62 if the connector barrel 60 is pushed or pulled back out of the opening 62 and away from the interior of the housing. Instead, the clip 65 may contact the radial surface 81 of the collar 69 disposed on the inner surface 71 of the wall 64, blocking movement of the connector barrel 60 along the longitudinal axis 90. Depending on the embodiment, the clip 65 may physically contact the radial surface 81 of the wall 64 at all or most times during operation, or a clearance may be included between the clip 65 and the radial surface 81 (e.g., to enable a limited amount of movement).

One or more of the disclosed embodiments, alone or in combination, may provide one or more technical effects useful in the manufacture of battery modules, and portions of battery modules. In general, embodiments of the present disclosure are directed to a battery module having a housing and a connector barrel at least partially disposed within the housing. For example, the connector barrel may be configured to facilitate mating of a first signal connector and a second signal connector within a conduit of the connector barrel. The connector barrel may be fixed within an opening of a wall defining an interior of the housing. For example, the wall may be sandwiched between a ridge of the connector barrel, and a clip disposed in a groove of the connector barrel after inserting the connector barrel into the opening. The connector barrel may also include flexible teeth disposed along the connector barrel and configured to be positioned within the opening once the connector barrel is fixed within the opening. The flexible teeth may bend to accommodate passage of the connector barrel through the opening, and may contact an inner diameter of the opening (e.g., with the flexible teeth in a bent position). Accordingly, the flexible teeth may generate a gasket seal surface that blocks egress and ingress of liquid and/or gas through the opening. The presently disclosed connector barrel may simplify the manufacturing/assembly process of the battery module, may improve a seal of the housing, and may reduce a part count of the battery module. The connector barrel is also capable of receiving a number of various types of signal connectors, in accordance with the description above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery system comprising a battery module, wherein the battery module comprises:
   a housing having a wall at least partially defining an interior of the housing, wherein the wall comprises an opening extending from an inner surface of the wall facing the interior of the housing to an outer surface of the wall opposite to the inner surface;
   a connector barrel having a first open end, a second open end, and a body portion extending between the first and second open ends, wherein the body portion is positioned within the opening of the wall, wherein the first open end is positioned within the interior of the housing, wherein the second open end is positioned external to the housing, wherein a ridge on the body portion of the connector barrel is disposed proximate to the outer surface of the wall, and wherein a first circumferential bump on the body portion of the connector barrel is disposed proximate to the inner surface of the wall;
   a securement component disposed within a space at least partially defined by the first circumferential bump of the connector barrel such that the securement component is positioned proximate to the inner surface of the wall, and such that the wall is sandwiched between the ridge of the connector barrel and the securement component;
   a low voltage signal connector extending through the first open end of the connector barrel; and
   a vehicle control module connector extending through the second open end of the connector barrel and mated with the low voltage signal connector within a hollow conduit of the body portion of the connector barrel.

2. The battery system of claim 1, wherein the securement component comprises a clip that applies a spring force against the body portion of the connector barrel to maintain a position of the clip within the space at least partially defined by the first circumferential bump.

3. The battery system of claim 1, wherein the connector barrel comprises a second circumferential bump proximate to the first circumferential bump such that the space in which the securement component is disposed is defined between the first and second circumferential bumps.

4. The battery system of claim 1, wherein the wall comprises a collar disposed on the inner surface of the wall and having a radial surface substantially parallel with the inner surface of the wall, wherein the opening extends through the radial surface of the collar such that the first circumferential bump and the securement component are positioned proximate to the radial surface of the collar, and wherein the collar of the wall is sandwiched between the ridge of the connector barrel and the securement component.

5. The battery system of claim 1, wherein the connector barrel comprises a longitudinal axis extending therethrough, wherein the first circumferential bump comprises an outer diameter with respect to the longitudinal axis, wherein the opening in the wall comprises an inner diameter with respect to the longitudinal axis, and wherein the outer diameter of the first circumferential bump is less than the inner diameter of the opening such that the first circumferential bump is capable of passing through the opening.

6. The battery system of claim 5, wherein the ridge extends a first radial distance from the longitudinal axis, and wherein the first radial distance is greater than the inner diameter of the opening.

7. The battery system of claim 1, wherein the connector barrel comprises a plurality of flexible teeth, and wherein the plurality of flexible teeth contact an inner diameter of the opening to form a gasket seal surface that blocks egress and ingress of gas and/or fluid through the opening as the ridge contacts the wall.

8. The battery system of claim 7, wherein the plurality of flexible teeth comprises rubber.

9. The battery system of claim 7, wherein the plurality of flexible teeth is adhesively coupled with the body portion of the connector barrel.

10. The battery system of claim 7, wherein the plurality of flexible teeth is integral with a flexible ring that is stretch fit around the body portion of the connector barrel.

11. The battery system of claim 1, wherein the housing comprises an external recess in which the second open end of the connector barrel is positioned.

12. The battery system of claim 1, wherein the connector barrel comprises electrically insulative material.

13. The battery system of claim 1, wherein the battery module is a lithium-ion battery module configured to receive lithium-ion electrochemical cells.

14. The battery system of claim 1, comprising a printed circuit board (PCB) disposed inside the housing of the battery module and having components in electrical communication with the low voltage signal connector.

15. A battery system comprising a connector barrel configured to receive a first signal connector and a second signal connector, the connector barrel comprising:
 a first open end, a second open end, and a body portion having a hollow conduit extending between the first open end and the second open end, wherein the first open end is configured to receive the first signal connector, wherein the second open end is configured to receive the second signal connector, and wherein the hollow conduit is configured to enable mating of the first and second signal connectors within the hollow conduit;
 a ridge extending radially outward from the hollow conduit of the body portion with respect to a longitudinal axis of the connector barrel;
 a first circumferential bump extending radially outward from the hollow conduit of the body portion with respect to the longitudinal axis, wherein the first circumferential bump at least partially defines a groove; and
 a clip configured to be disposed in the groove, wherein the ridge and the clip are configured to define a space in which a wall of a battery module of the battery system is positioned such that the wall is sandwiched between the clip and the ridge, such that the body portion of the connector barrel is disposed in an opening of the wall, such that the first open end of the connector barrel is disposed in an interior of the battery module, and such that the second open end of the connector barrel is disposed external to the battery module.

16. The battery system of claim 15, comprising a second circumferential bump extending radially outward from the hollow conduit of the body portion with respect to the longitudinal axis, wherein the second circumferential bump is positioned longitudinally between the first circumferential bump and the ridge, and wherein the groove is defined between the first and second circumferential bumps.

17. The battery system of claim 15, comprising the first signal connector, wherein the first signal connector is a low voltage signal connector.

18. The battery system of claim 15, wherein the connector barrel comprise a plurality of flexible teeth disposed longitudinally between the first circumferential bump and the ridge.

19. The battery system of claim 15, wherein the ridge extends a first distance from the longitudinal axis, wherein the first circumferential bump comprises a first diameter with respect to the longitudinal axis, and wherein the first distance is greater than the first diameter.

20. The battery system of claim 15, comprising the battery module, the wall of the battery module, and the opening of the wall, wherein the wall comprises an inner surface facing the interior of the battery module, wherein the wall comprises an outer surface opposite to the inner surface and facing external to the battery module, wherein the wall comprises a collar disposed on the inner surface of the wall, and wherein the opening extends through the wall and through the collar of the wall.

21. A battery system having a battery module, wherein the battery module comprises:
 a housing having a wall with an opening extending through the wall;
 a connector barrel having a body portion positioned within the opening, a first open end proximate to a first surface of the wall, a second open end proximate to a second surface of the wall opposite to the first surface of the wall, and a plurality of flexible teeth extending circumferentially about the body portion of the connector barrel and configured to define a gasket seal surface within the opening to block ingress and egress of fluids through the opening;
 a ridge of the connector barrel extending radially outward from a longitudinal axis of the connector barrel, wherein the ridge is disposed between the second surface of the wall and the second open end of the connector barrel, and wherein the ridge is configured to block movement of the connector barrel in a first direction along the longitudinal axis within the opening; and
 a securement mechanism coupled with the body portion of the connector barrel between the first surface of the wall and the first open end of the connector barrel, wherein the securement mechanism is configured to block movement of the connector barrel in a second direction along the longitudinal axis opposite to the first direction.

22. The battery system of claim 21, wherein the body portion of the connector barrel comprises one or more circumferential bumps at least partially defining a space or groove, and wherein the securement mechanism is coupled to the connector barrel at the space or groove.

23. The battery system of claim 21, wherein the inner surface of the wall comprises a collar through which the opening extends, and wherein the securement mechanism is configured to be disposed between a radial surface of the collar and the first open end of the connector barrel.

* * * * *